United States Patent [19]

Becher

[11] Patent Number: 4,462,253

[45] Date of Patent: Jul. 31, 1984

[54] APPARATUS FOR MOUNTING A WHEEL ON A BALANCER

[75] Inventor: Joel P. Becher, Uniontown, Ohio

[73] Assignee: The Goodyear Tire & Rubber Company, Akron, Ohio

[21] Appl. No.: 508,953

[22] Filed: Jun. 29, 1983

[51] Int. Cl.³ .......................................... G01M 1/04
[52] U.S. Cl. ................................................... 73/487
[58] Field of Search ..................... 73/487; 157/14, 21

[56]  References Cited

U.S. PATENT DOCUMENTS

| | | | |
|---|---|---|---|
| 3,580,320 | 5/1971 | Roberts | 73/487 X |
| 3,583,238 | 6/1971 | Haynes | 73/487 |
| 3,667,299 | 6/1972 | Roberts | 73/487 |
| 3,742,766 | 7/1973 | Mitchell | 73/484 |
| 3,888,128 | 6/1975 | Mitchell | 73/484 |
| 3,916,971 | 11/1975 | Carpenter et al. | 73/487 X |
| 3,995,498 | 12/1976 | Curchod et al. | 73/487 X |
| 4,093,311 | 6/1978 | Maus | 73/487 X |
| 4,167,118 | 9/1979 | Hihara | 73/487 |
| 4,202,214 | 5/1980 | Hihara | 73/487 |

Primary Examiner—James J. Gill
Attorney, Agent, or Firm—L. R. Drayer

[57] ABSTRACT

An apparatus for accurately centering a wheel on the spindle of a balancer is disclosed. The apparatus has mounting pins resiliently disposed in recesses in the surface of a disk member. The mounting pins have locations that correspond to the mounting holes in a wheel, and engage the mounting holes in the wheel when a means for securing retains the wheel against a planar surface of the disk member.

10 Claims, 4 Drawing Figures

APPARATUS FOR MOUNTING A WHEEL ON A BALANCER

BACKGROUND OF THE INVENTION

The present invention relates generally to an apparatus for testing the balance of wheels for automobiles and small trucks, and it relates more particularly to new and improved means for mounting wheels on such apparatus.

The accuracy of a balancer is limited by the degree to which the apparatus used to mount the wheel on the spindle of the balancer prevents deviation between the axis of rotation of the wheel and the longitudinal axis of the spindle of the balancer. For example, if a wheel of the type utilized on a typical passenger automobile is tilted as little as 0.005 inches (0.13 mm) at the mounting holes of the wheel from a plane perpendicular to the longitudinal axis of the spindle the balance results may be off one ounce (0.03 kg) on each side of the wheel. Displacement of the wheel in a direction perpendicular to the axes of the wheel and spindle of the wheel by 0.010 inches (0.26 mm) will cause the balance results to be off one ounce (0.03 kg). Even this small of an imbalance condition will cause a ride vibration problem on some vehicles.

It is now a common practice in the wheel balancing art to align a wheel relative to the longitudinal axis of the spindle of the balancer by using a centering member having a frustoconical outer surface provided with a central bore which fits closely over the spindle to permit the centering member to slide on the spindle without tilting. The diameter of the centering member at the end closest to the fixed end of the spindle is greater than the diameter of the center hole of a wheel that is to be balanced. and the diameter at the other end is less than the diameter of the center hole of the wheel to be balanced. The wheel is slipped over the free end of the spindle to the point where it has an interference fit on the centering member, and is then secured in place by a collar that is threadably attached to the spindle. This type of mounting system works very well with central hole centered type wheels because the vehicle designers use the central holes of central hole centered type wheels to center, or pilot, the wheels on the axle hubs of a vehicle. Mounting bolts are then used to secure the wheel in position on the vehicle. Since the bolt holes in these wheels are not used for centering the wheel on the axle, they should not be used for centering the wheel on a balancer.

However, the use of mounting hole centered type wheels has presented a problem with respect to wheel balancing because in such wheels the central hole is not used to center, or pilot, the wheels on the axle hubs of a vehicle. Mounting hole centered type wheels may have mounting holes in a pattern that will fit several brands of automobiles having different sizes of axle hubs, so the central holes of these wheels are purposely made to have a diameter larger than the axle hubs of at least some of the vehicles that these wheels may be mounted upon. Such wheels therefor are aligned with the axle hub by accurately located mounting holes. One problem with this mounting system is that the mounting holes in the wheel may wear in an eccentric manner during the use of the wheel on a vehicle, and merely relying on the precision of the mounting holes when mounting the wheel on a balancer may yield inaccurate results. These mounting hole centered type wheels also rely upon the perpendicularity of the surface of the wheel containing the mounting holes on the side of the wheel intended to engage the axle hub to the longitudinal axis of the axle as a means for indexing the alignment of the wheel on the axle.

The present invention provides an apparatus for mounting a wheel on a balancer that takes advantage of both the accuracy of the location of the mounting holes of the wheel and the precision of the surface of the wheel containing the mounting holes to give the smallest possible deviation between the axis of rotation of the wheel and the longitudinal axis of the spindle of the balancer.

SUMMARY OF THE INVENTION

In general, there is provided in accordance with the invention, an apparatus for mounting a wheel on a spindle having a circular backing plate coaxially attached thereto. The backing plate has a planar reference surface that is perpendicular to the axis of the spindle and faces an unsupported end of the spindle. A wheel to be mounted on the spindle has a plurality of mounting holes therethrough, with the centers of the mounting holes located on a mounting hole circle and symmetrically disposed around a central hole through the wheel. The mounting hole circle and central hole of the wheel have centers that are located on the axis of rotation of the wheel. The mounting apparatus comprises a disk member having first and second planar surfaces. The first planar surface has a plurality of circular recesses therein, with the centers of the recesses located on a mounting circle having the same diameter as the mounting hole circle of the wheel. These recesses are symmetrically disposed around a central bore through the disk member in a manner identical to the manner in which the mounting holes of the wheel are disposed around the central hole through the wheel. The central bore is coaxial with the disk member, and the mounting circle has a center that is located on this same axis. The central bore has a diameter such that the disk member can be slideably mounted on the spindle. A mounting pin is resiliently disposed in each of the recesses, with the axes of the mounting pins being parallel to the axis of the disk member and the central bore therethrough. An inwardly tapered portion of each mounting pin extends outwardly from the first planar surface of the disk member to engage a mounting hole of the wheel when the disk member is slideably mounted on the spindle and the second planar surface of the disk member engages the reference surface of the backing plate and a means for securing retains the wheel against the first planar surface of the disk member.

BRIEF DESCRIPTION OF THE DRAWINGS

An understanding of additional aspects of the invention can be gained from a consideration of the following detailed description of representative embodiments thereof, in conjunction with the appended figures of the drawing, wherein.

DETAILED DESCRIPTION OF THE INVENTION

Figure 1:
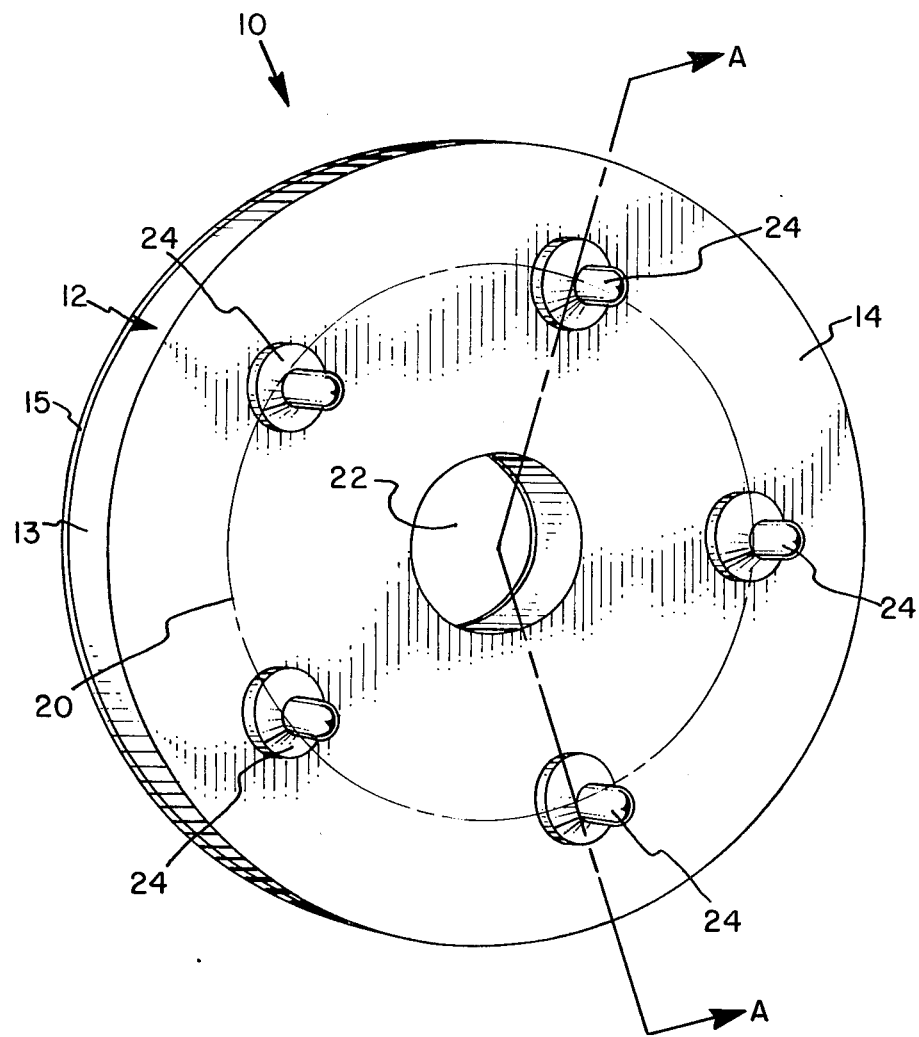
FIG. 1 is perspective view of a mounting apparatus according to one aspect of the invention.
Figure 2:
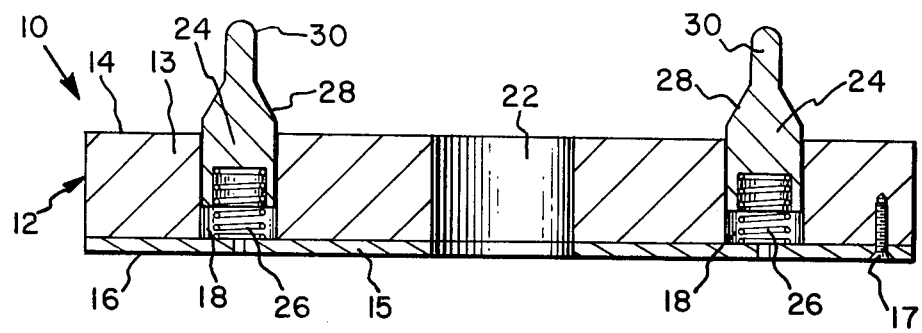
FIG. 2 is a view of a section through the mounting apparatus of FIG. 1 taken along line A—A.

Referring to FIG. 1 in conjunction with FIG. 2, there is shown an embodiment of a mounting apparatus 10 according to one aspect of the invention. FIG. 1 is a perspective view of the mounting apparatus 10 and FIG. 2 is a view of a section through the mounting apparatus taken along line A—A. The mounting apparatus 10 comprises a disk member 12 having first 14 and second 16 planar surfaces, which are parallel to one another. It is understood that while the disk member may comprise only a single disk of a suitable material such as metal, it may comprise a plurality of disks (13,15) attached to one another by a means for atachment such as a threaded fastener 17. The first planar surface 14 of the disk member has a plurality of circular recesses 18 therein. The centers of the recesses are located on a mounting circle 20 having its center located on the axis of rotation of the disk member. A central bore 22 is coaxial with and extends through the disk member 12, and has a diameter such that the disk member may be slideably mounted on the spindle of a balancer.

The present invention may be used for mounting a wheel of the type having a plurality of mounting holes therethrough with the centers of the mounting holes located on a mounting hole circle and symmetrically disposed around a central hole through said wheel. The invention may be most advantageously used for mounting a wheel of the mounting hole centered type on a balancer. The mounting hole circle and central hole have centers that are located on the axis of rotation of the wheel. While the mounting apparatus shown in FIGS. 1 and 2 has five circular recesses 18 in the first planar surface 14 of the disk member 12, it is understood that any number of recesses may be employed so long as: (a) the centers of the recesses are located on a mounting circle having the same diameter as the mounting hole circle of a wheel that the apparatus is designed to have mounted thereon; and (b) the recesses are symmetrically disposed around the central bore in a manner identical to the manner in which the mounting holes of said wheel are disposed around the central hole through said wheel.

A mounting pin 24 is resiliently disposed in each of the circular recesses 18, with the axes of the mounting pins being parallel to the axis of the disk member 12 and central bore 22. As used herein and in the appended claims, resiliently is understood to mean the capability of a body to return to its original location, size and shape after displacement or deformation caused by a compressive force. In the present instance, the compressive force will be exerted in a direction substantially parallel to the axes of the mounting pins towards the second planar surface 16 of the disk member. In the embodiment shown in FIGS. 1 and 2, the mounting pins 24 are resiliently disposed in the circular recesses 18 by means of springs 26 that exert a force, or urge, the mounting pins in a direction away from the second planar surface of the adapter plate. It is understood, however, that any means of providing resiliency such as a suitable elastomeric material or hydraulic dampers may be used without deviating from the scope of the invention. An inwardly tapered portion 28 of each mounting pin extends outwardly from the first planar surface 14 of the disk member to engage a mounting hole of a wheel (not shown). A guiding portion 30 of the mounting pin may extend outwardly of the tapered portion 28 to pilot the placing of a wheel on the mounting pins. The diameter of the tapered portion of the mounting pin at the end of the tapered portion closest to the first planar surface of the disk member is greater than the diameter of the mounting holes of a wheel that the apparatus will be used for mounting, and the other end of the tapered portion has a diameter less than the diameter of the mounting holes of a wheel the apparatus will be used for mounting. The tapered portions of the mounting pins allow the apparatus to be used with wheels having mounting holes of varying diameters, and also with a wheel that has mounting holes that may be worn to different diameters through use on vehicles.

Preferably the circular recesses 18 are of substantially identical diameter and depth and the mounting pins 24 each have substantially identical dimensions to allow interchangeability of the mounting pins. Most preferably the mounting pins are removable from the recesses, being merely slideably inserted therein. While the springs 26 are shown permanently attached to the mounting pins, it is understood that the means for providing resiliency may be separate from the mounting pins or even permanently attached inside the recesses without deviating from the scope of the invention. The mounting pins are preferably manufactured of hardened steel to resist wear caused by engaging the mounting holes of wheels as they are balanced. However, in the event that a mounting pin should become worn or damaged the ease with which it is replaceable is an advantage of the invention.

Figure 3:
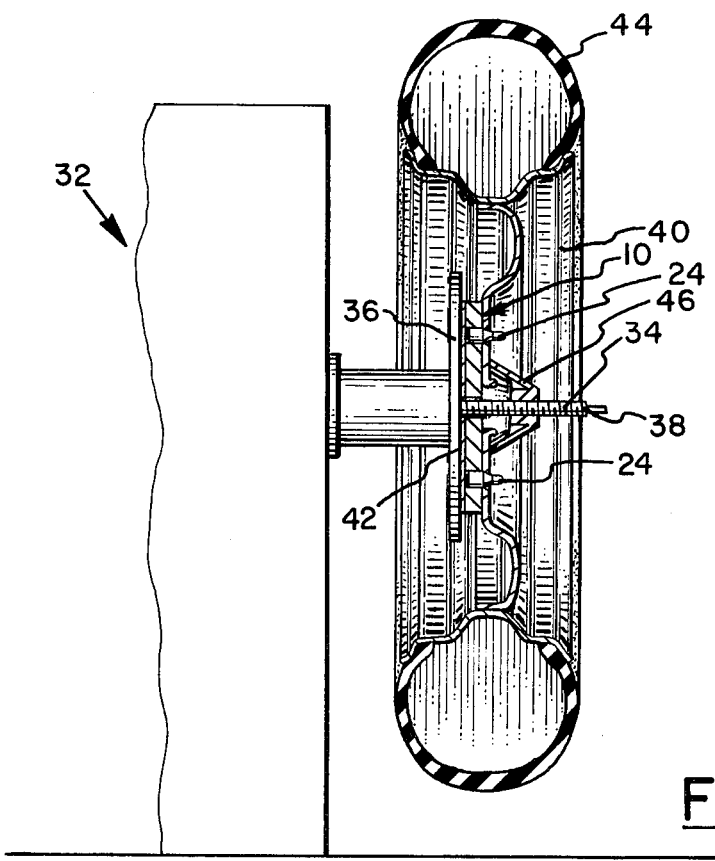
FIG. 3 is a schematic view, partly in section, showing the mounting apparatus of FIGS. 1 and 2 having a wheel mounted thereon, in combination with a wheel balancer.

The use of the mounting apparatus may be better understood by referring to FIG. 3, which is a schematic view, partly in section, showing the mounting apparatus 10 of FIGS. 1 and 2 in combination with a wheel balancer 32. The wheel balancer comprises a means for rotating a spindle (not shown) and a spindle 34 having a circular backing plate 36 coaxially attached thereto. One end of the spindle (not shown) is attached to the means for rotating and another end 38 of the spindle is unsupported so that a wheel 40 may be slideably mounted on the spindle. The backing plate has a planar reference surface 42 that is perpendicular to the axis of the spindle and backing plate and which faces the unsupported end of the spindle. In order to insure improved accuracy in balancing a wheel, the planar reference surface 42 of the backing plate, along with the first and second planar surfaces 14,16 of the disk member should be precisely machined so that these surfaces will be as nearly perpendicular as possible to the longitudinal axis of the spindle 34 when the disk member is mounted on the spindle.

The spindle of the wheel balancer is inserted through the central bore 22 of the disk member and the second planar surface of the disk member engages the reference surface of the backing plate, so that the disk member is coaxial with the spindle and backing plate. Preferably, the central bore of the disk member has a diameter such that the disk member is slideably mounted on the spindle, although the disk member may be threadably mounted on the spindle without deviating from the scope of the invention.

A wheel 40, which may have a tire 44 mounted thereon, is then placed around the spindle and mounted on the mounting apparatus 10 such that the mounting pins 24 engage the mounting holes of the wheel. A means for securing 46, such as a collar, attached by means for attachment, such as threads or a pin, to the spindle retains the wheel against the first planar surface of the disk member. When the wheel is first placed on the mounting pins, the means for providing resiliency are urging the mounting pins towards the unsupported end of the spindle, and if one of the mounting holes in the wheel is eccentric due to manufacture or wear the wheel may not initially be perpendicular to the longitudinal axis of the spindle of the balancer. However, when the means for securing 46 urges the side of the wheel that is distal from the unsupported end of the spindle into engagement with the first planar surface of the disk member the wheel is not only perpendicular to the longitudinal axis of the spindle, but it is securely retained in position by the tapered portions of the mounting pins which fit each individual mounting hole regardless of deviations in the diameters of the mounting holes.

While the spindle of the balancer shown in FIG. 3 is oriented in a horizontal direction, it is understood that an assembly in accordance with the invention may have a balancer with a spindle oriented in the vertical direction.

Figure 4:
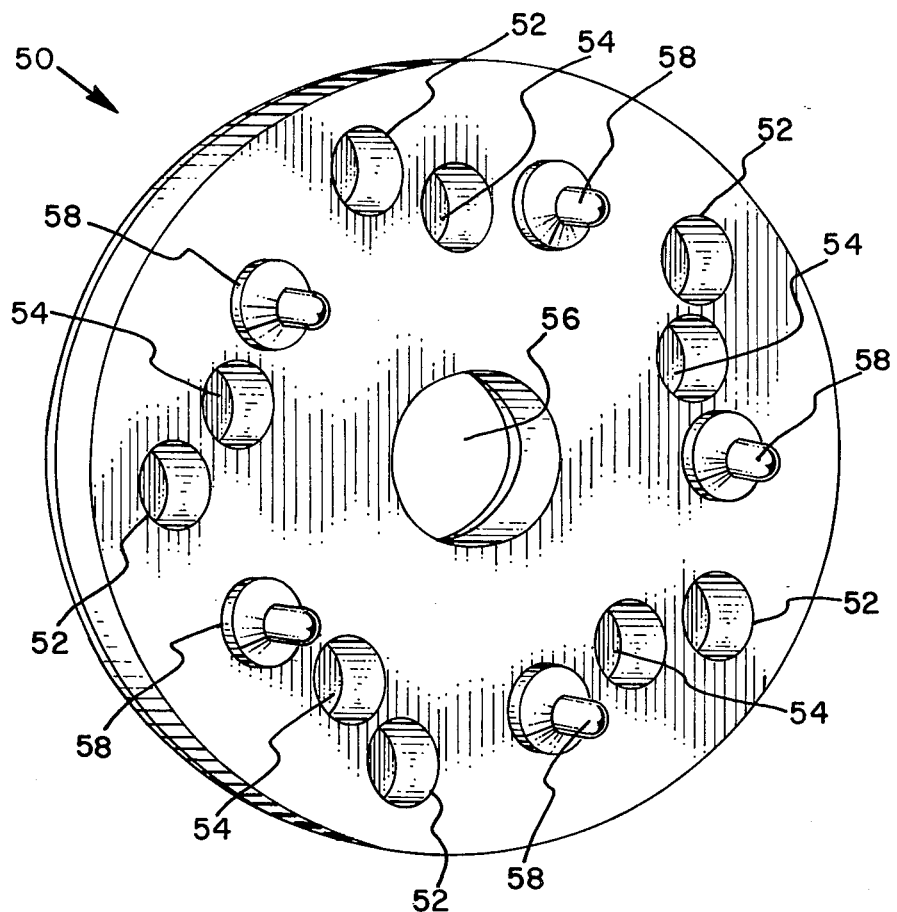
FIG. 4 is a perspective view of a mounting apparatus according to another aspect of the invention.

FIG. 4 is a perspective view of a mounting apparatus 50 according to another aspect of the invention. This mounting apparatus is similar to the apparatus shown in FIGs. 1 and 2, but it further comprises a second plurality of circular recesses 52 in the first planar surface of the disk member. The centers of the second plurality of recesses are located on a mounting circle that is concentric with the circle on which the centers of the first plurality of recesses 58 is located. The second plurality of recesses is symmetrically disposed around the central bore 56 through the disk member. Preferably the second plurality of recesses have substantially the same diameter and depth as the first plurality of recesses, and the centering pins are transferable to the second plurality of recesses so that a wheel having a different mounting hole configuration may be mounted on a balancer using the same apparatus. The embodiment illustrated in FIG. 4 is considered preferably because of its versatility, but in all other respects it functions in substantially the same manner as the embodiments shown in FIGS. 1, 2 and 3 and described herein.

A mounting apparatus according to the invention may even comprise a third plurality of mounting holes 54 symmetrically disposed about the central bore 56 on a third mounting hole circle.

The capacity of the preferred embodiment to be used for mounting wheels having a variety of mounting hole circle diameters without employing expensive, time consuming, and wearable devices such as gears and sliding arms is believed to be an advantage of the invention.

Many modifications of the embodiments disclosed herein that are within the scope of the invention will readily appear to those skilled in the art upon a reading of the present specification. Accordingly, the invention is to be construed as including all of the embodiments thereof that fall within the scope of the appended claims.

What is claimed is:

1. An apparatus for mounting a wheel on a spindle having a circular backing plate coaxially attached thereto, said backing plate having a planar reference surface that is perpendicular to said axis, said wheel having a plurality of mounting holes therethrough with the centers of the mounting holes located on a mounting hole circle and symmetrically disposed around a central hole through said wheel, said mounting hole circle and said central hole having centers that are located on the axis of rotation of said wheel, said apparatus comprising:

a disk member having first and second planar surfaces, said first planar surface having a first plurality of circular recesses therein with the centers of said recesses located on a mounting circle haing the same diameter as the mounting hole circle of said wheel and being symmetrically disposed around a central bore through said disk member in a manner identical to the manner in which the mounting holes of said wheel are disposed around the central hole through said wheel, said central bore being coaxial with said disk member and said circle having a center that is located on said axis, said central bore having a diameter such that said spindle may be inserted therethrough;

a mounting pin resiliently disposed in each of said recesses, the axes of said mounting pins being parallel to the axis of said disk member and central bore, an inwardly tapered portion of each mounting pin extending outwardly from said first planar surface to engage a mounting hole of said wheel when said spindle is inserted through said central bore such that said second planar surface engages the reference surface of said backing plate and a means for securing retains said wheel against said first planar surface.

2. An apparatus as described in claim 1 wherein said mounting pins are resiliently disposed in said recesses by springs, said springs exerting a force on said mounting pins in a direction away from the second planar surface of said disk member.

3. An apparatus as described in either of claims 1 or 2 wherein said recesses are of substantially identical diameter and depth, and said mounting pins each have substantially identical dimensions.

4. An apparatus as described in claim 3 wherein said mounting pins are removable.

5. An apparatus as described in claim 4 further comprising a second plurality of circular recesses in said first planar surface, the centers of said second plurality of recesses being located on a mounting circle that is concentric with the circle on which the centers of said first plurality of recesses is located, said second plurality of recesses being symmetrically disposed around said central bore, and said second plurality of recesses having substantially the same diameter and depth as said first plurality of recesses.

6. An assembly for balancing a wheel of the type having a plurality of mounting holes therethrough with the centers of the mounting holes located on a mounting hole circle and symmetrically disposed around a central hole through said wheel, said mounting hole circle and said central hole having centers that are located on the axis of rotation of said wheel, said assembly comprising:

(a) a wheel balancer comprising a means for rotating a spindle and a spindle having a circular backing plate coaxially attached thereto, one end of said spindle being attached to said means for rotating and another end of said spindle being unsupported, said backing plate having a planar reference surface that is perpendicular to said axis and faces the unsupported end of said spindle;

(b) an apparatus for mounting said wheel on said spindle comprising (i) a disk member having first and second planar surfaces, said first planar surface having a first plurality of circular recesses therein with the centers of said recesses located on a mounting circle having the same diameter as the mounting hole circle of said wheel and being symmetrically disposed around a central bore through said disk member in a manner identical to the manner in which the mounting holes of said wheel are disposed around the central hole through said wheel, the spindle of said wheel balancer being inserted through said central bore and said second planar surface engaging the reference surface of said backing plate, said disk member being coaxial with said spindle and backing plate, and (ii) a mounting pin resiliently disposed in each of said recesses, the axes of said mounting pins being parallel to the axis of said disk member, an inwardly tapered portion of each mounting pin extending outwardly from the first planar surface of said disk member to engage a mounting hole of said wheel; and (c) a means for securing attached by means for attachment to said spindle to retain said wheel against the first planar surface of said disk member.

7. An assembly as described in claim 6 wherein said mounting pins are resiliently disposed in said recesses by springs, said springs exerting a force on said mounting pins in a direction towards the unsupported end of said spindle.

8. An assembly as described in either of claims 6 or 7 wherein said recesses are of substantially identical diameter and depth, and said mounting pins each have substantially identical dimensions.

9. An assembly as described in claim 8 wherein said mounting pins are removable.

10. An assembly as described in claim 9 further comprising a second plurality of circular recesses in the first planar surface of said disk member, the centers of said second plurality of recesses being located on a mounting circle that is concentric with the circle on which the centers of said first plurality of recesses is located, said second plurality of recesses being symmetrically disposed around said central bore, and said second plurality of recesses having substantially the same diameter and depth as said first plurality of recesses.

* * * * *

UNITED STATES PATENT AND TRADEMARK OFFICE
CERTIFICATE OF CORRECTION

PATENT NO. : 4,462,253
DATED : July 31, 1984
INVENTOR(S) : Joel P. Becher

It is certified that error appears in the above-identified patent and that said Letters Patent are hereby corrected as shown below:

Column 6, line 13, "haing" should be --having--.

Signed and Sealed this

Nineteenth Day of March 1985

[SEAL]

*Attest:*

DONALD J. QUIGG

*Attesting Officer*  *Acting Commissioner of Patents and Trademarks*